US006821427B2

(12) United States Patent
Macpherson et al.

(10) Patent No.: US 6,821,427 B2
(45) Date of Patent: Nov. 23, 2004

(54) METHODS FOR REDUCING THE AMOUNT OF CONTAMINANTS IN WATER

(75) Inventors: John Wallace Macpherson, Snohomish, WA (US); Jason Jacob Ziemer, Buckley, WA (US); Everett J. Nichols, Edmonds, WA (US)

(73) Assignee: Vanson Halosource, Inc., Redmond, WA (US)

( * ) Notice: Subject to any disclaimer, the term of this patent is extended or adjusted under 35 U.S.C. 154(b) by 0 days.

(21) Appl. No.: 10/827,812

(22) Filed: Apr. 20, 2004

(65) Prior Publication Data

US 2004/0195185 A1 Oct. 7, 2004

Related U.S. Application Data (62) Division of application No. 10/033,695, filed on Dec. 28, 2001, now Pat. No. 6,749,748.

(51) Int. Cl.[7] .................................................. C02F 1/56
(52) U.S. Cl. ........................ 210/631; 210/602; 210/727; 210/728; 210/730; 210/731; 210/734; 252/176; 252/180
(58) Field of Search .................. 210/602, 631, 210/725, 727, 728, 730, 731, 734, 192, 198.1, 199, 206, 209; 252/176, 180; 422/263, 276

(56) References Cited

U.S. PATENT DOCUMENTS

| | | |
|---|---|---|
| 2,072,976 A | 3/1937 | Andrus |
| 3,533,940 A | 10/1970 | Peniston et al. |
| 3,839,202 A | 10/1974 | Roy |
| 4,382,864 A | 5/1983 | Hashimoto et al. |
| 4,820,424 A | 4/1989 | Field et al. |
| 4,822,579 A | 4/1989 | Wagner |
| 4,975,542 A | 12/1990 | Hirayama et al. |
| 5,053,113 A | 10/1991 | Krepets et al. |
| 5,336,415 A | 8/1994 | Deans |
| 5,708,152 A | 1/1998 | Lohmann et al. |
| 5,932,107 A | 8/1999 | Domard et al. |
| 6,130,321 A | 10/2000 | Johnson et al. |
| 6,203,711 B1 | 3/2001 | Moffett |
| 6,403,032 B1 | 6/2002 | Abercrombie et al. |
| 6,749,748 B1 * | 6/2004 | Macpherson et al. ..... 210/198.1 |

FOREIGN PATENT DOCUMENTS

| | | |
|---|---|---|
| JP | 62-62827 | 3/1987 |
| JP | 8-269104 | 10/1996 |
| JP | 9-143205 | 6/1997 |
| JP | WO 00/50090 A2 | 8/2000 |
| WO | WO 97/42975 A3 | 11/1997 |

OTHER PUBLICATIONS

Allan, G.G. and M. Peyron, "Molecular weight manipulation of chitosan I: Kinetics of depolymerization by nitrous acid," *Carbohydrate Research*, 277:257–272, 1995.

Bégin, A., and M–R. Van Calsteren, "Antimicrobial Films Produced From Chitosan," *International Journal of Biological Macromolecules 26*: 63–67, 1999.

Demarger–André, S., and A. Domard, "Chitosan Behaviours in a Dispersion of Undecylenic Acid," *Carbohydrate Polymers* 22:117–126, 1993.

(List continued on next page.)

*Primary Examiner*—Peter A. Hruskoci
(74) *Attorney, Agent, or Firm*—Christensen O'Connor Johnson Kindness PLLC (57) ABSTRACT

In one aspect the present invention provides purification devices for reducing the amount of contaminants in water, each device includes a water-soluble flocculant disposed within a body defining a multiplicity of pores, wherein the pores have an average diameter in the range of from 1 μm to 2000 μm. The present invention also provides methods for reducing the amount of contaminants in water.

40 Claims, 3 Drawing Sheets

OTHER PUBLICATIONS

Demarger-André, S., and A. Domard, "Chitosan Behaviours in a Dispersion of Undecylenic Acid. Morphological Aspects," *Carbohydrate Polymers 27*:101–107, 1995.

Domard, A., and N. Cartier, "Glucosamine Oligomers: 1, Preparation and Characterization," *International Journal of Biological Macromolecules 11*:297–302, 1989.

Focher, B., et al., "Chitosans From *Euphausia Superba*. 2: Characterization of Solid State Structure," *Carbohydrate Polymers 18*:43–49, 1992.

Kikkawa, Y., et al., "A Convenient Preparation Method of Chito–Oligosaccharides by Acid Hydrolysis," *J. Fac. Agric. Tottori Univ. 26*:9–17, 1990.

Kumar, M.N.V.R., "A Review of Chitin and Chitosan Applications," *Reactive & Functional Polymers 46*:1–27, 2000.

Li, J., et al., Effect of Degree of Daecetylation of Chitin on the Properties of Chitin Crystallites, John Wiley & Sons, Inc. ccc 0021–8995/97/020373–08, 1997, pp. 373–380.

Muzzarelli, R.A.A., "Chitosan–Based Dietary Foods," *Carbohydrate Polymers 29*:309–316, 1996.

Product Literature, describing Sea–Klear® Tablets and Sea–Klear® Liquid, which were on sale at least as early as May 1, 1998 (3 pp).

Product Literature, Wilke Resources, Inc. Product literature disclosing chitosan useful in kits of the invention, Jul. 1998.

Qu, X., et al., "pH–Sensitive Hydrogels Based on Chitosan and D,L–Lactic Acid," *Rapra Abstracts*, Oxford, Pergamon Press Ltd. 36(4):117, Apr. 1999.

Rogozhin, S.V., et al., "The Partial Acidic Hydrolysis of Chitosan," *Polymer Science U.S.S.R. 30*(3):607–614, 1988.

Signini, R. and S.P. Campana Filho, "On the Preparation and Characterization of Chitosan Hydrochloride," *Polymer Bulletin 42*:159–166, 1999.

T. Yui et al., "Molecular and Crystal Structure of the Anhydrous Form of Chitosan," *Macromolecules*, 27:7601–7605, 1994.

Vincendon, M., "Regenerated Chitin From Phosphoric Acid Solutions," *Carbohydrate Polymers 32*:233–237, 1997.

\* cited by examiner

METHODS FOR REDUCING THE AMOUNT OF CONTAMINANTS IN WATER

CROSS-REFERENCE TO RELATED APPLICATION

This application is a divisional of application Ser. No. 10/033,695, filed Dec. 28, 2001 now U.S. Pat. No. 6,749,748.

FIELD OF THE INVENTION

The present invention relates to methods for reducing the amount of contaminants in water, such as methods that utilize a chitosan salt disposed within a porous device that is at least partially immersed in running, contaminated, water.

BACKGROUND OF THE INVENTION

Storm water which runs off land cleared of vegetation, such as on construction sites and other developed sites, typically exhibits a high degree of contamination due to the presence of suspended sediment, metals, oil and other chemicals and particulate matter. Stringent water quality standards, enforced under the Clean Water Act, have created the need to purify contaminated stormwater. In addition, many cities and states have environmental regulations that require developers to utilize Best Management Practices to meet water quality standards. These regulations mandate that contaminated water must be collected and treated to reduce contamination before discharging into the environment, such as into streams and vegetated areas.

There is therefore a continuing need for devices and methods to reduce the amount of contaminants in water before it is discharged into the environment. Preferably the devices and methods utilize materials that are not toxic to the environment.

SUMMARY OF THE INVENTION

In accordance with the foregoing, in one aspect the present invention provides purification devices for reducing the amount of contaminants in water, each device includes a water-soluble flocculant disposed within a body defining a multiplicity of pores, wherein the pores have an average diameter in the range of from 1 $\mu$m to 2000 $\mu$m. In operation, the purification devices of the present invention are at least partially submerged in running, contaminated, water which dissolves at least a portion of the flocculant. The dissolved flocculant forms water-insoluble complexes with one or more contaminants in the water. The complexes can be removed from the treated water, such as by filtration. The purification devices of the present invention are therefore useful in any situation where reduction in the amount of contamination of water is desirable, such as in the treatment of turbid storm run-off water to reduce turbidity.

The present invention also provides methods for reducing the amount of contaminants in water. The methods of the invention each include the steps of: (a) at least partially immersing a purification device in running water, wherein (1) the purification device includes a water-soluble flocculant disposed within a body defining a multiplicity of pores, wherein the pores have an average diameter in the range of from 1 $\mu$m to 2000 $\mu$m; (2) the water comprises a contaminant; (3) the purification device is at least partially immersed in the running water under conditions whereby at least a portion of the flocculant is dissolved in the water and binds to at least some of the contaminant to form water-insoluble complexes; and (b) removing at least some of the water-insoluble complexes from the water. By way of example, at least some of the water-insoluble complexes can be removed from the treated water by dispersing treated water over a vegetated area; or dispersing treated water over a sand filter; or dispensing treated water into a settling tank wherein the water-insoluble complexes sediment.

The methods of the invention are useful in any situation where it is desired to reduce the amount of contaminants in water, such as, for example, reducing the amount of contaminants in water running off excavation and construction sites, and reducing the amount of contaminants in storm run-off water. The devices of the invention are useful, for example, in the methods of the invention.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Unless specifically defined herein, all terms used herein have the same meaning as they would to one skilled in the art of the present invention.

As used herein, the term "flocculant" refers to a composition that binds noncovalently to one or more contaminants in water to form water-insoluble complexes that can be removed from the water.

In one aspect, the present invention provides purification devices for reducing the amount of contaminants in water, each device comprising a water-soluble flocculant disposed within a body defining a multiplicity of pores, wherein the pores have an average diameter in the range of from 1 $\mu$m to 2000 $\mu$m.

Figures 1, 2:
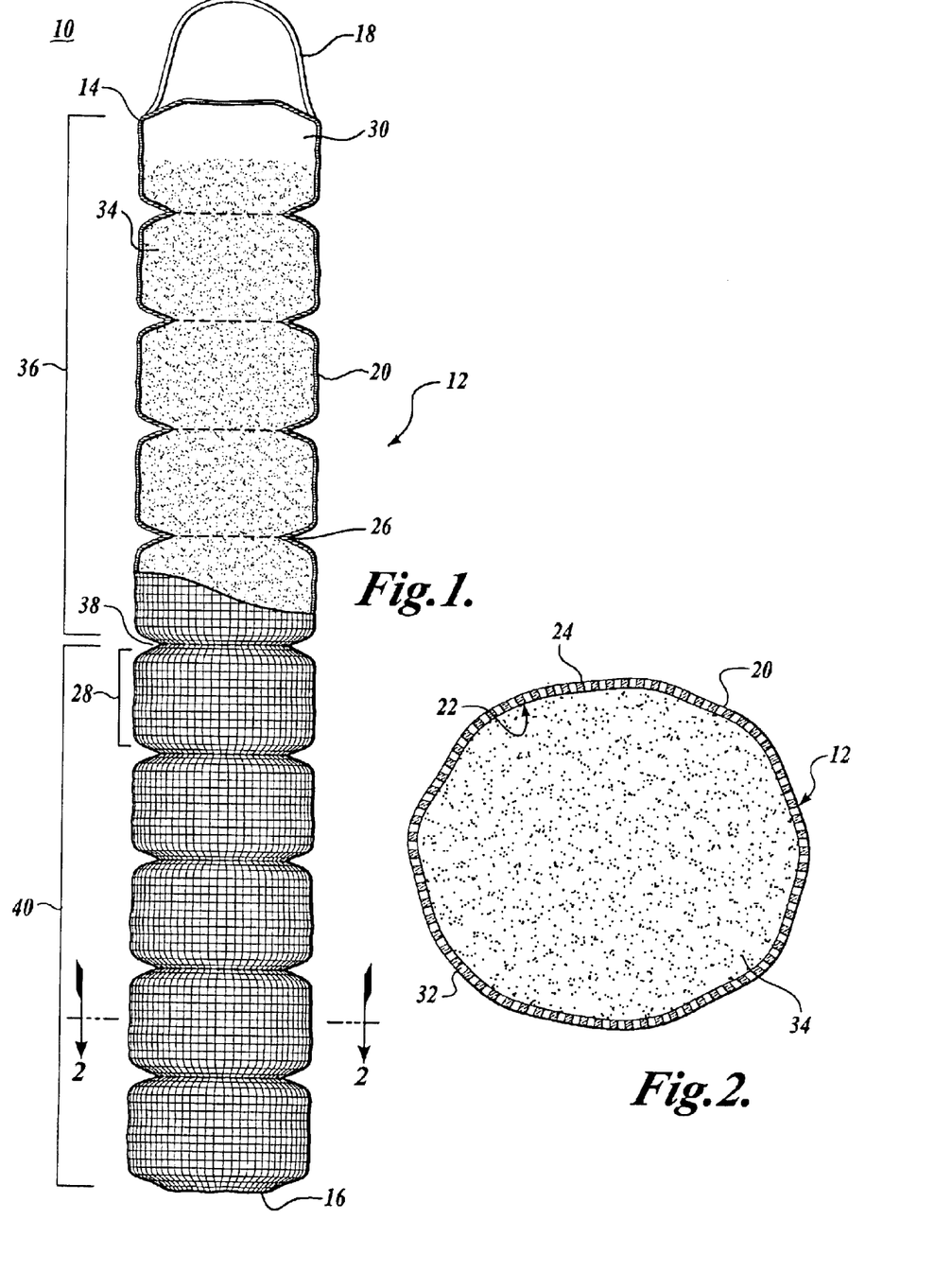
FIG. 1 shows a representative embodiment of a purification device of the present invention comprising a segmented body (partially cut away).
FIG. 2 shows a cross-sectional view of the device shown in FIG. 1 which more clearly shows the flocculant disposed within the device.

FIG. 1 shows one embodiment of a purification device 10 of the present invention, which includes a body 12 that has a first end 14 and a second end 16, and a handle 18 attached to body first end 14. As shown more clearly in the cross-section of device 10 shown in FIG. 2, body 12 includes a body wall 20 defining an inner surface 22 and an outer surface 24. Again with reference to FIG. 1, body wall 20 includes stitching 26, perpendicular to the long axis of body 12, at regularly spaced intervals along its length that divide body wall 20 into segments 28. Each segment 28 defines a lumen 30. Body wall 20 is penetrated by a multiplicity of pores 32 (shown more clearly in FIG. 2) that connect body inner surface 22 and body outer surface 24.

A water-soluble flocculant 34 is disposed within lumen 30 of each segment 28. In the embodiment shown in FIG. 1, lumen 30 closest to first end 14 is only partially filled with flocculant 34 in order to more clearly show lumen 30. By way of example, flocculant 34 can be in the form of a powder or gel. Each segment 28 can include the same or different flocculant 34 as one or more of the other segments 28. The embodiment of purification device 10 shown in FIG. 1 is flexible. Flexibility is facilitated by the segmentation of body 12.

Device body 12 includes a first half 36, extending from body first end 14 to body midpoint 1, and a second half 40, extending from body midpoint 1 to body second end 16. In some embodiments of device 10, lumen 30 of some segments 28 within device body first half 36 are filled with an anionic water-soluble flocculant 34, while lumen 30 of remaining segments 28 are filled with a cationic water-soluble flocculant 34. In some embodiments of device 10, lumen 30 of some segments 28 within device body first half 36 are filled with a cationic water-soluble flocculant 34, while lumen 30 of remaining segments 28 are filled with an anionic water-soluble flocculant 34.

In operation, purification device 10 is at least partially immersed in moving water that contains one or more contaminants. The water penetrates pores 32 and contacts flocculant 34 which begins to dissolve. Dissolved flocculant 34 leaves lumen 30 through pores 32 and forms insoluble complexes with contaminants in the water (although the formation of insoluble complexes can begin at the moment that flocculant 34 is dissolved by the water).

Figure 3:
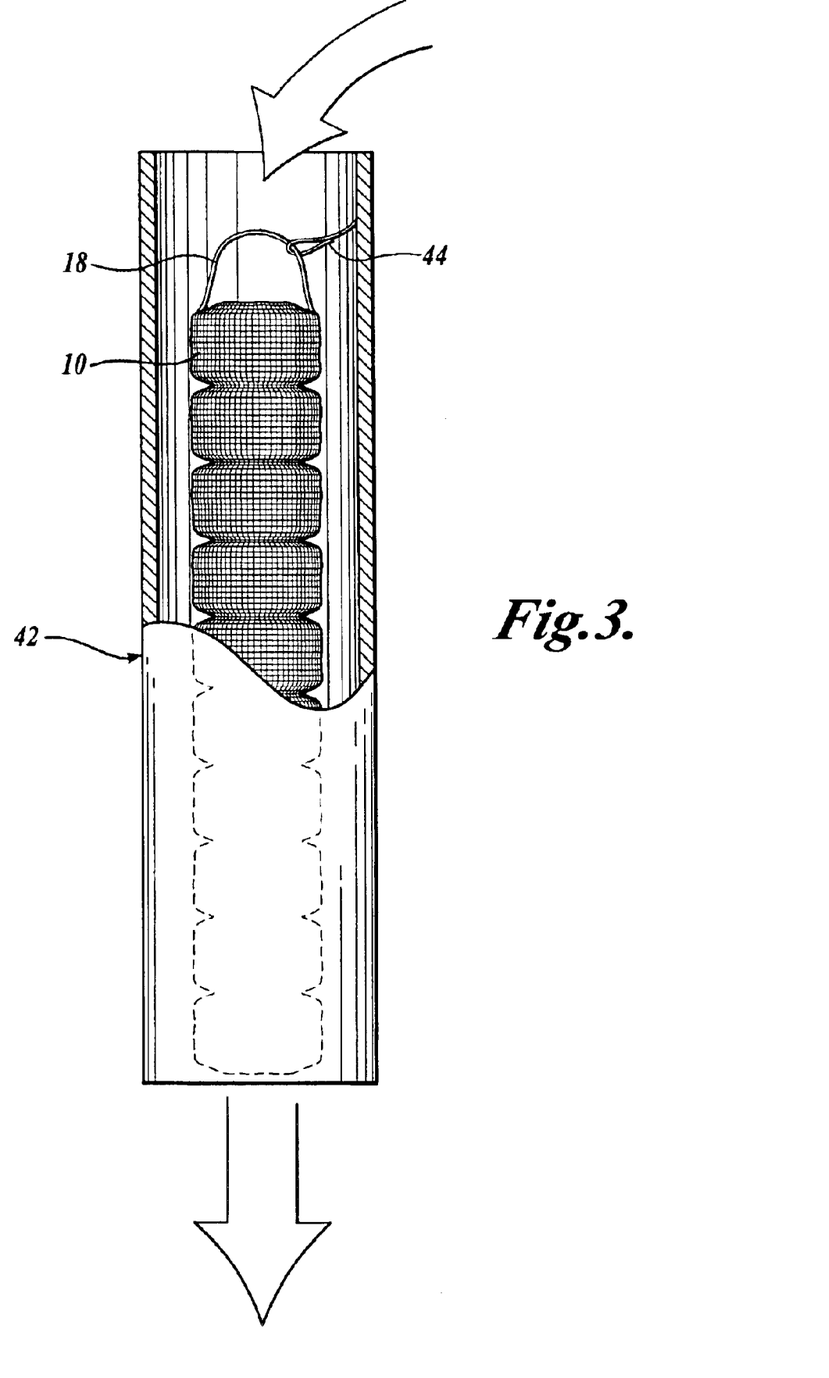
FIG. 3 shows an embodiment of a purification device of the invention disposed within a conduit (partially cut away) that transports contaminated water.

By way of example, FIG. 3 shows purification device 10 disposed within a conduit 42 (such as a metal or plastic pipe). Purification device 10 is attached to an attachment loop 44 within conduit 42 by handle 18. Contaminated water enters conduit 42 (for example from a pond that collects run-off water from a construction site) and passes over purification device 10. The direction of flow of water in FIG. 3 is shown by arrows. Purification device 10, anchored inside conduit 42, may be fully immersed in water, such as when the amount of water flowing through conduit 42 is large, or may be only partially immersed in water, such as when a lesser amount of water is flowing through conduit 42. The running water dissolves a portion of flocculant 34 within purification device 10, and dissolved flocculant 34 interacts with contaminants in the water to form water-insoluble complexes. The water leaves conduit 36 and can be directed, for example, to a settling pond, or a filtration means, which removes some or all of the water-insoluble complexes from the water.

Although the embodiment of device 10 shown in FIG. 1 has a generally cylindrical (although segmented) shape when filled with flocculant 34, device 10 can be any shape that is adapted for use in a particular application. For example, device 10 can be spherical, oval, square, linear, branched or helical. Some helical devices 10 can rotate within the flow of water. Typically, it is desirable that device 10 be sufficiently flexible to at least partially bend in response to force exerted by water moving over device 10. In this regard, device 10 can be segmented, such as in the embodiment shown in FIG. 1, although it is not necessary that device 10 be segmented.

Device body 12 can be made from any material that is sufficiently strong to retain flocculant 34 and to resist the forces exerted by water moving over device 10, and which is sufficiently porous to allow water to penetrate device 10 to contact flocculant 34 within lumen 30, although pores 32 should not be so large that they permit rapid escape and dissolution of flocculant 34. Typically, the diameter of pores 32 is from 1 $\mu$m to 2000 $\mu$m, such as from 50 $\mu$m to 1000 $\mu$m, or from 100 $\mu$m to 800 $\mu$m. Representative examples of materials useful for making device body 12 include natural and/or synthetic, woven or non-woven, materials. Materials useful for making device body 12 can be made, for example, from the following exemplary animal fibers: silk, sheep wool, mohair, llama wool, alpaca, vicuna, camel hair, and horse hair. Materials useful for making device body 12 can be made, for example, from the following exemplary vegetable fibers: cotton, jute, kapok, flax, hemp, Manila hemp, istle, ramie, sisal hemp, and Spanish moss. An exemplary inorganic fiber that can be used to make materials useful for making device body 12 is asbestos. Examples of synthetic materials useful for making device body 12 include nylon, polyolefins, polypropylene, and polyester. Blends of any of the foregoing natural and/or synthetic fibers are also useful for making device body 12.

An example of a commercially available woven fabric useful for making device body 12 is a blend of 65% polyester and 35% cotton which is referred to as a "poplin weave" and is supplied by MYBAG of Lynnwood, Wash., U.S.A. Another example of a useful synthetic knitted fabric is Geoknit which is manufactured by Syfilco Industrial Knitting, 320 Thames Road E., Exeter, Ontario, Canada.

Some embodiments of device body 12 are stretchable. Some embodiments of device body 12 can stretch up to 110%, or up to 125% or up to 150% of their unstretched length. Making device body 12 from a stretchable material helps to control the amount of flocculant 34 that is released into the water by allowing a portion of flocculant 34 to be squeezed out of device 10 through pores 32. For example, when the flow rate of water over purification device 10 is large, higher hydraulic shear stresses are applied to device 10 than when the flow rate of water over purification device 10 is smaller. Consequently, at higher flow rates, device body 12 is stretched more than at lower flow rates and, due to the increase in pressure within device 10, a larger amount of flocculant 34 is squeezed out of device body 12. Thus, a larger amount of flocculant 34 is dissolved more quickly in response to a higher flow rate of water over device 10. Further, hydraulic shear stress may cause a segmented device 10 to articulate in a more agitated manner. This agitation may cause momentary and localized increases in internal pressure in parts of device 10, resulting in squeezing of additional flocculant 34 through pores 32. If the hydraulic pressure within device body 12 rises to a level that might tear body wall 20, holes can be punched in body wall 20 to relieve the pressure.

Device 10 can optionally include an attachment means, such as handle 18, that is attached to device body 12 and which is used to attach device 10 to a support, such as to a metal or plastic pipe when device 10 is disposed therein. The attachment means can be made from any material (such as metal or plastic) that is sufficiently strong to attach device 10 to a support and to resist the forces applied by moving water to device 10 during the course of normal operation.

Water-soluble flocculants 34 useful in the practice of the invention are water-soluble and bind non-covalently to one or more types of contaminants in water to form water-insoluble flocculant/contaminant complexes. Flocculants 34 may be used, for example, in a dry form (e.g., powder), or in the form of a gel or paste. The choice of flocculant involves consideration of such factors as the identity of the principal contaminant(s) in the water to be treated, and the affinity of the flocculant for the principal contaminant(s). Examples of contaminants typically found in ground water include soil particles, metal ions, phosphates, orthophosphates, and oil, such as lubricating or fuel oil. By way of non-limiting example, flocculants 34 useful in the practice of the present invention include chitosan salts. Again by way of example, flocculants 34 useful in the practice of the present invention include cationic or anionic forms of N-halochitosans, gums, starches, and polyacrylamide (including copolymers of acrylic acid and acrylamide, and copolymers of acrylamide and quaternary ammonium compounds). Mixtures of different individual flocculants 34 can be used in the practice of the invention, such as a mixture of a chitosan salt and an N-halochitosan. Some devices 10 of the invention include both anionic and cationic flocculants 34.

With respect to solubility in water, under normal operating conditions flocculants 34 should dissolve at a rate that permits a reasonable working lifetime. Thus, for example, some embodiments of device 10 can treat 500,000 gallons of stormwater before all of flocculant 34 is dissolved.

Chitosan salts useful as flocculants in the practice of the invention typically have a molecular weight in the range of from 20,000 Daltons to two million Daltons, such as from 50,000 Daltons to one million Daltons, or such as from 100,000 Daltons to 900,000 Daltons. Chitosan salts useful in the practice of the invention typically have a percentage deacetylation of from 50% to 100%, such as from 60% to 95%, or from 70% to 90%. Some chitosan salts useful in the practice of the invention are a salt of chitosan with a $C_1$ to $C_{18}$ mono-or polycarboxylic acid, such as chitosan acetate or chitosan lactate. By way of non-limiting example, chitosan salts useful in the practice of the invention include: chitosan glutamate, chitosan hydrochloride, chitosan succinate, chitosan fumarate, chitosan adipate, chitosan glycolate, chitosan tartrate, chitosan formate, chitosan malate, and chitosan citrate.

Other useful flocculants include anionic or cationic forms of any of the following compounds: N-halochitosans, gums, starches, and polyacrylamides. Exemplary N-halochitosans useful in the practice of the invention are polymers that include 1% to 35% 2-deoxy-2-acetamidoglucose monomeric units, 1% to 90% 2-deoxy-2-aminoglucose monomeric units and 8% to 98% 2-deoxy-2-haloaminoglucose monomeric units, wherein the haloamino group is chloroamino or bromoamino or iodoamino. Exemplary cationic gums include polysaccharide gums such as cationic guar which is neutral guar that has been chemically modified to contain quarterly amines. Anionic polysaccharides (both naturally occurring and chemically produced through chemical derivitization of neutral polysaccharides) are useful as flocculants 34. Examples of anionic polysaccharides include sodium or potassium alginate, carrageenans, carboxymethylcellulose, carboxymethylchitosan, locust bean gum, dextran sulfate, succinylated starch, succinylated chitosan, and pectins. Inorganic anionic flocculants 34 include polyphosphates, such as hexametaphosphate.

After contaminated water has passed over purification device 10, and water-insoluble flocculant/contaminant complexes have formed, the water-insoluble flocculant/contaminant complexes can be removed from the water by any useful means, such as by filtration or sedimentation. Typically the water can then be discharged into the environment, although heavily contaminated water might require further purification.

Purification devices 10 may be used to reduce the amount of one or more contaminants in water in any situation where reduction in the amount of one or more contaminants in water is desirable. Purification devices 10 may be used, for example, for reducing the amount of soil sediment, and/or other material impurities, such as metal ions and oil. Non-limiting examples of situations in which purification devices 10 may be used to reduce the amount of one or more contaminants in water include the treatment of: run-off water from excavation and construction sites, stormwater run-off, highway run-off, water in a fountain, water captured at stream crossings on timber harvest sites, petroleum spills, water in detention ponds, and water in temporary sediment traps. In operation, purification devices 10 of the invention may be fully or partially immersed in running water.

In another aspect, the present invention provides methods for reducing the amount of contaminants in water, the methods each including the steps of: (a) at least partially immersing a purification device in running water, wherein (1) the purification device includes a water-soluble flocculant disposed within a body defining a multiplicity of pores, wherein the pores have an average diameter in the range of from 1 $\mu$m to 2000 $\mu$m; (2) the water includes a contaminant; (3) the purification device is at least partially immersed in the running water under conditions whereby at least a portion of the flocculant is dissolved in the water and binds to at least some of the contaminant to form water-insoluble complexes; and (b) removing at least some of the water-insoluble complexes from the water.

The methods of this aspect of the invention can be used to reduce the amount of one or more contaminants in water in any situation where it is desired to reduce the amount of one or more contaminants in water, such as in any of the situations described supra in which purification devices 10 can be used to reduce the amount of one or more contaminants in water.

The description of the methods of the invention is made with reference to the use of devices 10 of the invention which are disclosed and described herein. In the practice of the methods of the invention, purification device 10 is disposed within running, contaminated, water so that device 10 is either fully submerged or partially submerged in the water. Purification device 10 may be fixed within a water conducting means, such as a channel, conduit, pipe, drainpipe, ditch, or spillway. Body wall outer surface 24 of purification device 10 is exposed to contaminated water moving through the water conducting means. The moving water penetrates pores 32 of body wall 20 to dissolve at least some of flocculant 34 which interacts with contaminants in the turbid water to form water-insoluble complexes.

Water may be moved over or around device 10 by any suitable means. For example, the water may flow due to gravity, or may be actively pumped through a pipe or other conduit. For example, when gravity flow is utilized and device 10 is disposed within a conduit, the diameter of the conduit that contains purification device 10 may be varied depending on the desired flow rate (e.g., the larger the diameter of the conduit, the higher the flow rate of the water passing therethrough). Again by way of example, a pump may be used to pump the contaminated water past purification device 10 of the present invention. The amount of water flow may be measured to determine the number of purification devices 10 to be used and/or the amount of flocculant 34 necessary to reduce the amount of contamination to the desired level.

The amount of flocculant 34 required depends on such factors as the level of contamination in the water to be treated, and the type of contaminants in the water. Some contaminants (such as soil particles) cause the contaminated water to be turbid. The level of water turbidity can be expressed as Nephelometric Turbidity Units (NTUs) as described in The Nalco Water Handbook, Kemmer, F. N., and J. McCallion, (eds), pp. 4–18 to 4–19, McGraw-Hill Book Company, New York, N.Y., 1979, the cited portions of which publication are incorporated herein by reference. For example, construction site run-off water may have turbidities ranging from about 50 NTU up to about 2000 NTU. Normal functioning fresh water bodies typically have low turbidity of less than 50 NTU. In some embodiments of the methods of the invention, the contaminated water to be treated has a turbidity in the range of from about 50 to about 10,000 NTUs. In some embodiments of the methods of the invention, the contaminated water to be treated has a turbidity in the range of from about 500 to about 1000 NTUs.

In some embodiments of the methods of the invention, the turbidity of the contaminated water, after treatment in accordance with the methods of the invention, is reduced by up to 25% compared to the turbidity of the contaminated water before treatment in accordance with the methods of the invention. In some embodiments of the methods of the invention, the turbidity of the contaminated water, after treatment in accordance with the methods of the invention, is reduced by up to 50% compared to the turbidity of the contaminated water before treatment in accordance with the methods of the invention. In some embodiments of the methods of the invention, the turbidity of the contaminated water, after treatment in accordance with the methods of the invention, is reduced by up to 75% compared to the turbidity of the contaminated water before treatment in accordance with the methods of the invention. In some embodiments of the methods of the invention, the turbidity of the contaminated water, after treatment in accordance with the methods of the invention, is reduced by up to 100% compared to the turbidity of the contaminated water before treatment in accordance with the methods of the invention.

The size of purification device 10, and the corresponding amount of flocculant 34, may be varied according to the level of turbidity present, and/or multiple purification devices 10 may be used. For example, higher turbidity levels may be treated with additional purification devices 10, such as several purification devices 10 arranged in series within a water conduit, such as a pipe. Example 1 herein provides guidance with respect to the purification capacity of an embodiment of device 10 shown in FIG. 1.

In some embodiments, the methods of the invention further comprise the step of sedimenting contaminant particles from contaminated water before at least partially immersing device 10 in the running water, thereby reducing the level of turbidity prior to contacting purification device 10 with the contaminated water. For example, storm water may be allowed to settle in a settling basin prior to pumping the water past purification device 10.

The pH of the contaminated water may affect the performance of the flocculant. The contaminated water to be treated in accordance with the invention is preferably in the pH range of from 6.5 to 8.5, most preferably about pH 7.0. If the pH of the contaminated water is outside this range, the pH may be adjusted before treatment.

In some embodiments of the methods of the invention device 10 includes both an anionic flocculant 34 and a cationic flocculant 34. For example, in some embodiments of device 10, lumen 30 of most or all segments 28 within device body first half 36 are filled with an anionic water-soluble flocculant 34, while lumens 30 of most or all segments 28 within device body second half 40 are filled with a cationic water-soluble flocculant 34. Device 10 can be oriented within running contaminated water so that the water first contacts anionic water-soluble flocculant 34 and then contacts cationic water-soluble flocculant 34. This arrangement is desirable, for example, when treating run-off water from soil that is more cationic than anionic as it promotes efficient formation of water-insoluble complexes.

In some embodiments of the methods of the invention, device 10 includes both an anionic flocculant 34 and a cationic flocculant 34, and more water-soluble anionic flocculant 34 is disposed within first half 36 of body 12 than within second half 40 of body 12, and purification device 10 is oriented with respect to the running water so that the running water contacts first half 36 of body 12 before contacting second half 40 of body 12. In some embodiments of the methods of the invention, at least 90% of water-soluble anionic flocculant 34 is disposed within first half 36 of body 12. In some embodiments of the methods of the invention, at least 99% of water-soluble anionic flocculant 34 is disposed within first half 36 of body 12.

In the practice of the methods of the invention, at least some of the water-insoluble flocculant/contaminant complexes are removed from the treated water. The water-insoluble complexes may be removed from the water by any useful means including, for example, sedimentation and filtration. Non-limiting examples of filtration means useful in the methods of the invention include biofiltration, sand filtration and the use of cartridge filters.

In biofiltration, treated water containing water-insoluble flocculant/contaminant complexes is dispersed over a vegetated area and the insoluble complexes are trapped by the vegetation while the water passes into the soil. The factors that are considered when choosing a dispersal area for biofiltration include the type of vegetation, the area covered by vegetation, the gradient of the dispersal area, and the soil type. In sand filtration, water containing water-insoluble complexes is dispersed over one or more layers of sand which traps the insoluble complexes.

Sedimentation may be used to separate the water-insoluble complexes from the treated water. Thus, for example, purification device 10 may be anchored upstream from a catch basin that discharges to a settling basin wherein the water-insoluble complexes in the treated water are allowed to sediment; or, by way of example, purification device 10 may be anchored in a dike, swale or ditch that discharges to a settling basin. Again by way of example, purification device 10 may be anchored downstream of checkdams discharging to settling basins. Once the water-insoluble complexes have settled out of the water, the water can usually be discharged to the environment.

Figure 4:
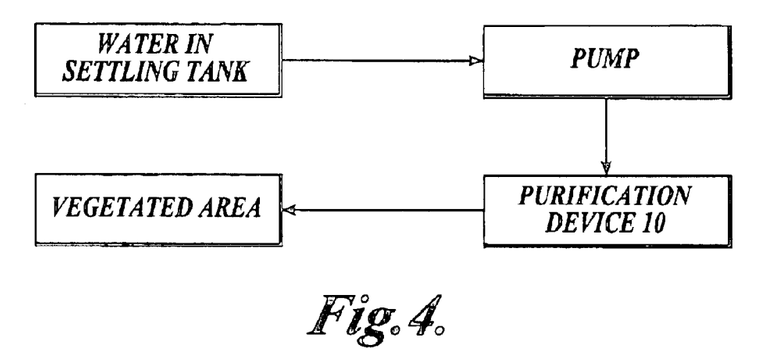
FIG. 4 is a flow diagram showing an embodiment of a method of the invention for reducing the amount of contaminants in water utilizing biofiltration.

In one representative embodiment of the methods of the invention, as shown in FIG. 4, contaminated water is located within a settling tank wherein at least a portion of sediment and particulate matter suspended in the water settles to the bottom of the tank. The contaminated water is pumped from the tank, through a pipe, over purification device 10, and is then dispersed over a vegetated area wherein the vegetation physically traps the water-insoluble flocculant/contaminant complexes.

Figure 5:
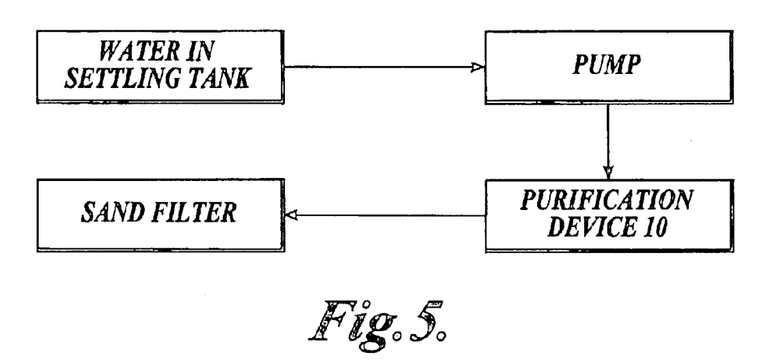
FIG. 5 is a flow diagram showing an embodiment of a method of the invention for reducing the amount of contaminants in water utilizing sand filtration.

In another representative embodiment of the methods of the invention, as shown in FIG. 5, contaminated water is located within a settling tank wherein at least a portion of sediment and particulate matter suspended in the water settles to the bottom of the tank. Contaminated water is pumped from the tank, through a pipe, over purification device 10 and is then dispensed into a sand filter wherein the sand physically entraps the water-insoluble flocculant/contaminant complexes.

Figure 6:
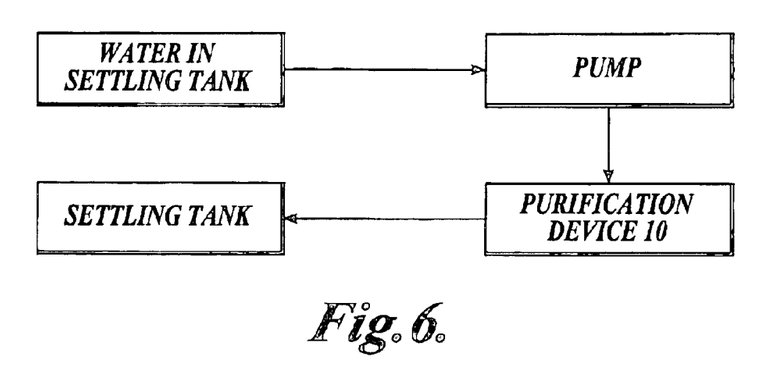
FIG. 6 is a flow diagram showing an embodiment of a method of the invention for reducing the amount of contaminants in water utilizing a settling tank.

In another representative embodiment of the methods of the invention, as shown in FIG. 6, contaminated water is located within a settling tank wherein at least a portion of sediment and particulate matter suspended in the water settles to the bottom of the tank. Contaminated water is pumped from the tank, through a pipe, over purification device 10 and is then dispensed into a settling tank wherein the water-insoluble flocculant/contaminant complexes sediment to the bottom of the tank. Optionally, the settling tank can contain soluble flocculant to further facilitate formation of water-insoluble flocculant/contaminant complexes.

The following example merely illustrates the best mode now contemplated for practicing the invention, but should not be construed to limit the invention. All literature citations herein are expressly incorporated by reference.

EXAMPLE 1

This Example describes the use of an embodiment of purification device 10 shown in FIG. 1 to reduce the turbidity of storm water running off a construction site.

The embodiment of device 10 described in this Example weighs approximately ten pounds when full of chitosan lactate gel, and has dimensions, when full of chitosan lactate gel, of approximately six and a half feet long, by seven inches wide, by two inches deep.

Device 10 provides effective storm water management on construction projects by removing sediment from contaminated water before discharging the water into natural waterways. One device 10 can treat up to 500,000 gallons of storm water with a maximum flow rate of one cubic foot per second, or about 450 gallons per minute. If desired, one or more perforations, each of about one quarter inch diameter, can be made in one or more segments 28 to facilitate release of chitosan lactate. Typically, when dealing with contaminated water flow rates greater than five hundred gallons per minute, and a level of turbidity in the contaminated water of one hundred NTUs or less, no perforations are made in segments 28. Typically, when dealing with contaminated water flow rates greater than three hundred gallons per minute, and a level of turbidity in the contaminated water of one hundred NTUs or more, a single perforation, of about one quarter inch diameter, is made in each segment 28. Typically, when dealing with contaminated water flow rates less than three hundred gallons per minute, and a level of turbidity in the contaminated water of one hundred NTUs or more, four perforations, each of about one quarter inch diameter, are made in each segment 28.

If there is adequate vegetation on or near the construction site, biofiltration can be used to remove water-insoluble flocculant/contaminant particles from water treated with device 10. Contaminated water is pumped over device 10 (which can be disposed within a pipe connected to the pump) and then into a pipe dispersal system in a vegetated area. The water-insoluble contaminant/flocculant complexes stick to vegetation in the biofilter.

The minimum recommended biofiltration path length is 50 linear feet with a dispersal rate of 0.5 to 2 gallons per linear foot of dispersal pipe. The actual path length varies according to the level of contamination of the water and the effectiveness of the biofilter. A biofiltration system 150 feet long can disperse up to 200 gallons per minute.

Table 1 shows the number of devices 10 described in this Example required to treat various amounts of storm water running off construction sites of different sizes.

TABLE 1

| Size of construction site (acres) | Rainfall in 24-hour period (inches) | Maximum rainfall runoff (gallons) | Number of devices 10 needed |
|---|---|---|---|
| 5 | 1 | 136,000 | .5 |
|  | 2 | 272,000 | 1 |
|  | 3 | 407,000 | 1 |
| 10 | 1 | 272,000 | 1 |
|  | 2 | 543,000 | 1.5 |
|  | 3 | 815,000 | 2 |
| 20 | 1 | 543,000 | 1.5 |
|  | 2 | 1,086,000 | 2.5 |
|  | 3 | 1,629,000 | 3.5 |
| 50 | 1 | 1,358,000 | 3 |
|  | 2 | 2,715,000 | 6 |
|  | 3 | 4,073,000 | 9 |

Table 2 shows the number of devices 10 described in this Example required to treat contaminated water pumped at various rates, using a variety of pump sizes, from a construction site. Table 2 also shows the expected working life span of device 10. The abbreviation "gpm" means gallons per minute.

TABLE 2

| Size of Pump | Flow rate (gpm) | Number of devices 10 required | Longevity (hours of pumping) |
|---|---|---|---|
| 2-inch | 50–200 | 1 | 40 |
| 3-inch gas | 200–300 | 1 | 30–40 |
| 4-inch diesel | 500–700 | 2 | 24–33 |
| 6-inch diesel | 700–1000 | 3 | 25–36 |

Table 3 shows the number of devices 10 described in this Example required to treat contaminated water flowing under the force of gravity, at various flow rates, from a construction site. Table 3 also shows the typical volume of contaminated water treated before device 10 has to be replaced.

TABLE 3

| Flow rate (gpm) | Number of devices 10 required | Effective volume treated before replacement of device 10 |
|---|---|---|
| ≦450 | 1 | 0.5 million gallons |
| 450–900 | 2 | 1 million gallons |
| >900 | 3 | 1.5 million gallons |

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for reducing the amount of contaminants in water, said method comprising the steps of:
   (a) at least partially immersing a purification device in running water, wherein
      (1) the purification device comprises a water-soluble flocculant disposed within a body defining a multiplicity of pores, wherein the pores have an average diameter in the range of from 1 $\mu$m to 2000 $\mu$m, the body comprising a body wall defining an inner surface and an outer surface, wherein the body wall is divided into segments, and the water-soluble flocculant is disposed within a lumen of each segment;

(2) the water comprises a contaminant;

(3) the purification device is at least partially immersed in the running water under conditions whereby at least a portion of the flocculant is dissolved in the water and binds to at least some of the contaminant to form water-insoluble complexes; and (b) removing at least some of the water-insoluble complexes from the water.

2. The method of claim 1 wherein the water comprising a contaminant has a turbidity of from 50 to 10,000 Nephelometric Turbidity Units before treatment in accordance with the method of claim 1.

3. The method of claim 1 wherein the water comprising a contaminant has a turbidity of from 500 to 1000 Nephelometric Turbidity Units before treatment in accordance with the method of claim 1.

4. The method of claim 1 wherein the water comprising a contaminant has a starting concentration of the contaminant before treatment of the water in accordance with the method of claim 1, and an ending concentration of the contaminant after treatment of the water in accordance with the method of claim 1, and the value of the ending concentration of the contaminant is less than 75% of the value of the starting concentration of the contaminant.

5. The method of claim 4 wherein the value of the ending concentration of the contaminant is less than 50% of the value of the starting concentration of the contaminant.

6. The method of claim 4 wherein the value of the ending concentration of the contaminant is less than 25% of the value of the starting concentration of the contaminant.

7. The method of claim 4 wherein the value of the ending concentration of the contaminant is less than 10% of the value of the starting concentration of the contaminant.

8. The method of claim 1 wherein the pH of the water comprising a contaminant is from 6.5 to 8.5 before treatment in accordance with the method of claim 1.

9. The method of claim 1 wherein the removal of at least some of the water-insoluble complexes is by biofiltration.

10. The method of claim 1 wherein the removal of at least some of the water-insoluble complexes is by sand filtration.

11. The method of claim 1 wherein the removal of at least some of the water-insoluble complexes is by sedimentation.

12. The method of claim 1 wherein the purification device body is flexible.

13. The method of claim 12 wherein the purification device body is stretchable.

14. The method of claim 1 wherein the purification device body is stretchable.

15. The method of claim 1 wherein the purification device body is made from a woven fabric.

16. The method of claim 1 wherein the pores have an average diameter in the range of from 50 $\mu$m to 1000 $\mu$m.

17. The method of claim 1 wherein the pores have an average diameter in the range of from 100 $\mu$m to 800 $\mu$m.

18. The method of claim 1 wherein the purification device further comprises means for attaching the device to a substrate.

19. The method of claim 1 wherein the flocculant comprises a water-soluble cationic flocculant.

20. The method of claim 19 wherein the water-soluble cationic flocculant is selected from the group consisting of a chitosan salt, a cationic N-halochitosan, a cationic gum, a cationic starch, and a cationic polyacrylamide.

21. The method of claim 20 wherein the water-soluble cationic flocculant is a chitosan salt.

22. The method of claim 21 wherein the chitosan salt has an average molecular weight in the range of from 20,000 Daltons to two million Daltons.

23. The method of claim 21 wherein the chitosan salt has an average molecular weight in the range of from 50,000 Daltons to one million Daltons.

24. The method of claim 21 wherein the chitosan salt has an average molecular weight in the range of from 100,000 Daltons to 900,000 Daltons.

25. The method of claim 21 wherein the chitosan salt has a percentage deacetylation in the range of from 50% to 100%.

26. The method of claim 21 wherein the chitosan salt has a percentage deacetylation in the range of from 60% to 95%.

27. The method of claim 21 wherein the chitosan salt has a percentage deacetylation in the range of from 70% to 90%.

28. The method of claim 21 wherein the chitosan salt is selected from the group consisting of chitosan lactate, chitosan glutamate, chitosan hydrochloride, chitosan succinate, chitosan fumarate, chitosan adipate, chitosan glycolate, chitosan tartrate, chitosan formate, chitosan malate, and chitosan citrate.

29. The method of claim 20 wherein the water-soluble cationic flocculant is a cationic N-halochitosan.

30. The method of claim 20 wherein the water-soluble cationic flocculant is a cationic gum.

31. The method of claim 20 wherein the water-soluble cationic flocculant is a cationic starch.

32. The method of claim 20 wherein the water-soluble cationic flocculant is a cationic polyacrylamide.

33. The method of claim 1 wherein the flocculant consists essentially of a water-soluble cationic flocculant.

34. The method of claim 33 wherein the water-soluble cationic flocculant is selected from the group consisting of a chitosan salt, a cationic N-halochitosan, a cationic gum, a cationic starch, and a cationic polyacrylamide.

35. The method of claim 1 wherein the flocculant comprises a water-soluble anionic flocculant.

36. The method of claim 35 wherein the anionic flocculant is selected from the group consisting of an anionic gum, an anionic starch and an anionic polyacrylamide.

37. The method of claim 1 wherein the flocculant comprises a water-soluble cationic flocculant and a water-soluble anionic flocculant.

38. The method of claim 37 wherein:

(a) the device body comprises a first half and a second half, and more water-soluble anionic flocculant is disposed within the first half of the body than within the second half of the body; and (b) the purification device is oriented with respect to the running water so that the running water contacts the first half of the body before contacting the second half of the body.

39. The method of claim 37 wherein at least 90% of the water-soluble anionic flocculant is disposed within the first half of the body.

40. The method of claim 37 wherein at least 99% of the water-soluble anionic flocculant is disposed within the first half of the body.

* * * * *